United States Patent Office 3,076,363
Patented Feb. 5, 1963

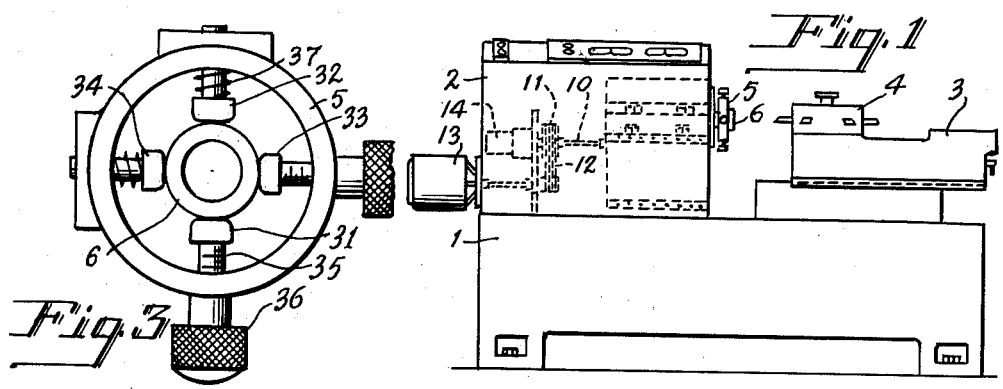
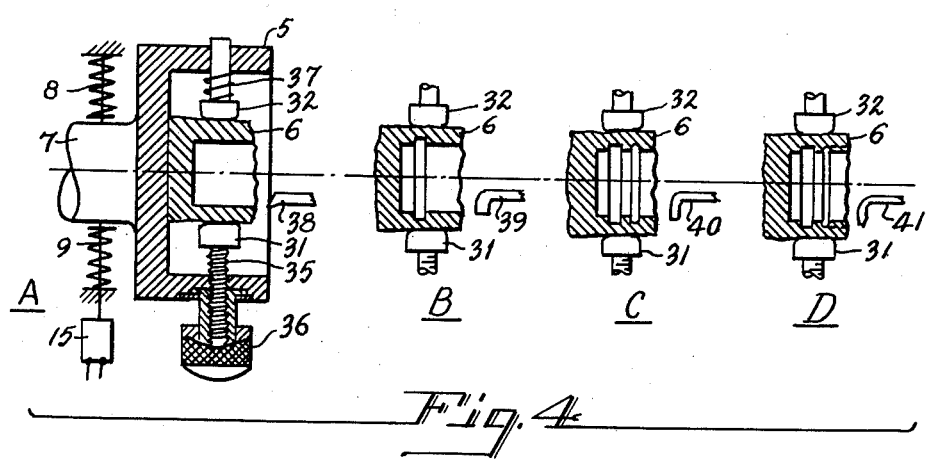
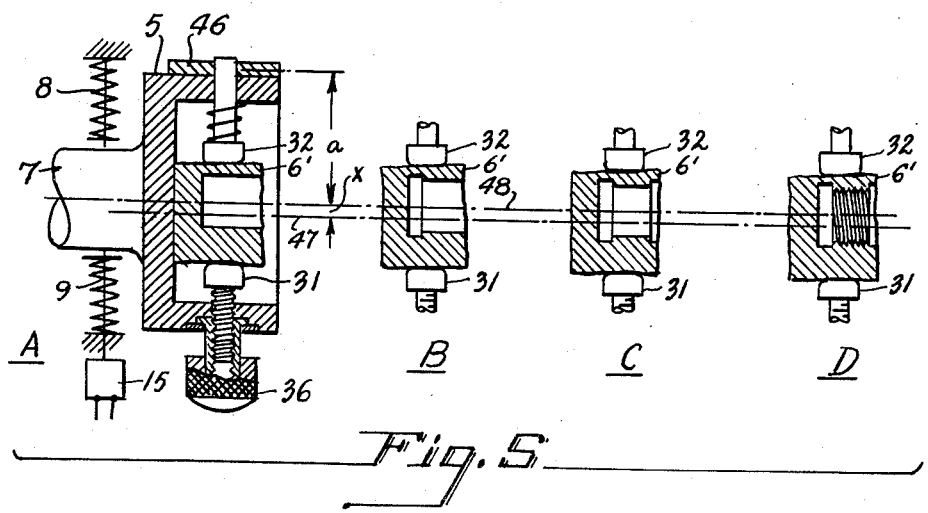

3,076,363
MEANS FOR MACHINING ROTATING
WORKPIECES
Heinrich Hack, Darmstadt, Germany, assignor to Carl Schenck Maschinenfabrik, G.m.b.H., Darmstadt, Germany, a corporation of Germany
Filed Aug. 22, 1957, Ser. No. 679,615
Claims priority, application Germany Nov. 18, 1950
7 Claims. (Cl. 82—2)

My invention relates to the machining of rotating workpieces and is herein disclosed as a continuation-in-part of my copending application Serial No. 268,156, filed January 25, 1952, now Patent No. 2,804,775, which originated from my abandoned application Serial No. 230,929, filed June 11, 1951, and is assigned to the assignee of the present invention; and this disclosure is also related, as a continuation-in-part, to my copending application Serial No. 522,335, filed July 15, 1955, now abandoned, and assigned to the same assignee.

Workpieces that, when finished, are to be rotatable about their geometric axis without unbalance, must be given particular care when being fabricated by machining. If such a workpiece is machined successively on different machine tools, it is necessary to accurately realign the workpiece after passing it from one to the next machine tool. This is so because the workpiece-holding devices of machine tools, such as chucks, tailstock centers, mandrels or the like, may have different amounts of tolerance and do not always secure sufficient machining accuracy to prevent unbalance in the finished product.

It is an object of my invention to minimize or eliminate the necessity for repeated aligning of the workpiece and to obviate the detrimental effect of differences in holder tolerances so as to produce a satisfactorily centered and rotationally balanced product even if the machine tools being used have workpiece holders of different type or the workpieces have rough or irregular chuck-engaged surfaces.

To this end, and in accordance with a feature of my invention, I do away with the initial balancing and center-marking or center-drilling heretofore used for establishing a balance axis before passing the workpiece from a balancing or centering machine to the machine tool or tools needed for the subsequent machining proper. Instead I machine the workpiece at its outer or inner periphery directly on the same rotating workpiece holder, on which the workpiece is first adjusted to have its main inertia axis or gravity center aligned with the axis of rotation; that is, the tool or sequence of tools needed for machining or finishing the workpiece are applied while the workpiece remains attached to, and rotating together with, the holder or chuck used for the balance alignment.

According to a more specific feature of the invention, I provide the machine with at least one workpiece holder or chuck which is inherently balanced and vibratorily mounted so as to cause unbalance vibrations to occur when the workpiece on the rotating holder is unbalanced; and I displace the workpiece on the holder into a position where such unbalance vibrations disappear, before machining the workpiece on the same holder and during rotation thereof, by cutting tools or the like tool means that attack the rotating workpiece peripherally at a location eccentric to, and radially spaced from, the axis of rotation, such as is the case with cutting tools used for turning-work on a lathe.

A sequence of machining operations by different tools may thus be performed to convert the workpiece from a rough blank or casting into the finished or semi-finished product, without requiring any initial or repeated center marking, so that the method is also suitable for hollow workpieces not permitting the provision of center markings such as center bores.

According to still another feature of the invention, preferably relating to axially short workpieces such as fan or pump rotors, the workpiece is unilaterally clamped in a single vibratorily journalled chuck on which the workpiece is aligned to have its inertia axis or gravity center coincide with the journal axis, so that, once a balanced run is established, the entire front face is accessible to the machining tools. Of course, for machining axially elongated rotors, two axially spaced workpiece holders or chucks, both vibratorily mounted, must be provided to secure dynamic balance of the chuck-workpiece assembly before machining the workpiece on these holders.

The above-described method will be more fully understood from the following description in conjunction with the embodiments of lathe-type machine tools according to the invention illustrated, by way of example, on the drawing.

FIG. 1 is a front view of a machine seen from the operator's place,

FIG. 3 is a front view of the chuck, FIG. 4 illustrates four sequential steps A to D of a machining sequence, FIG. 5 represents four steps A to D of another machining sequence.

Before describing the illustrated machines, it may be mentioned that the particular means used for detecting unbalance or checking balance are not essential to the invention proper and are known as such in various forms. For that reason, the illustrated electric balance-analyzing systems are greatly simplified to show only the essentials necessary for understanding the invention. If desired, however, more detailed information on such systems may be had, for instance, from the book "Dynamics of Machinery," by James B. Hartman, published 1956 by McGraw-Hill Book Company, Inc., New York, page 149, or from U.S. Patent No. 2,706,399 of Klaus Federn, or from my copending application Serial No. 522,335, filed July 15, 1955, now abandoned.

For simplicity of further explanation of the principle involved, let us at first suppose that the balancing method is to be performed with a disc-shaped body so that a balance adjustment is needed in only one correction plane.

Figure 8:
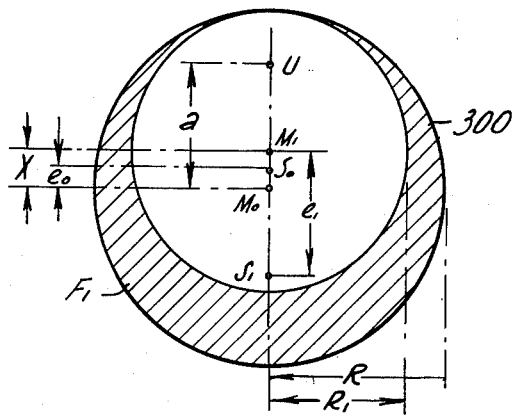
FIGS. 8 and 9 are explanatory and show respectively a front view and an axial section of unfinished rotors affected by unbalance, purposely shown exaggerated.
Figure 9:
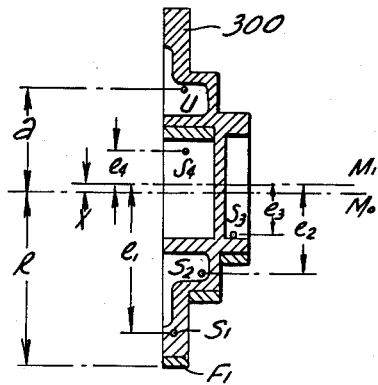
Figure 10:
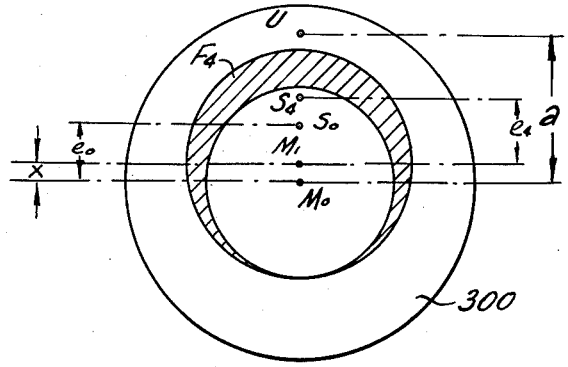
FIG. 10 is another explanatory view of the same rotor.

In FIGS. 8 and 9, the largest radius of a disc-shaped, stepped rotor body 300 is denoted by R. The geometric center axis of the rotor, indicated at $M_0$, is hereinafter referred to as the "primary axis." The rotor is assumed to have a local unbalance weight represented by its mass center U whose distance from the primary axis $M_0$ is denoted by $a$ and which has a particular angular position with respect to the primary axis. The assumed or inherent unbalance U lies along a diameter through the geometric center axis $M_0$ of the rotor. This diameter is the reference diameter for all subsequent balancing operations and when required may be used to index the rotor in the balance centering machine. The location of the reference diameter is predetermined by the characteristic shape of the article, by non-controllable dissymmetrical machining operations, or by eccentricity purposely built into the rotor to supply material for subsequent machining in accordance with the invention to simply and accurately achieve balance simultaneously with the final machining operations. The reference diameter is thus readily apparent by inspection and appropriate index marks, if desired, can be made on the periphery of the rotor. It will be noted that rotors to be balanced according to the invention are such as have portions to be machined that are substantially symmetrical about an axial plane containing the reference diameter. The unbalance moment caused by the local unbalance weight U, relative to the primary axis $M_0$, is equal to the product of $U \cdot a$. Due to this unbalance, the gravity center $S_0$ of the entire rotor is spaced a distance $e_0$ from the primary axis $M_0$. For clarity of illustration, the distance $e_0$ is shown exaggerated.

The conventional method of eliminating the unbalance by mass centering requires that the main inertia axis through the gravity point $S_0$ be brought into coincidence with the axis of rotation, for instance, with the primary axis $M_0$. In contrast, the balance-centering method according to the invention does not result in such a coincidence, but aims at establishing a machining axis $M_1$ at a predetermined distance $x$ from the primary axis $M_0$ along the reference diameter. The desired machining axis $M_1$ is hereinafter referred to as the "secondary axis." When the secondary axis $M_1$ is established and the body is subjected to machining about this axis, the machining has the effect of eliminating along the periphery of the body an amount of material corresponding to the cross-hatched sickle-shaped area $F_1$, thus reducing the body to the radius $R_1$. Thereafter, the body is balanced about the secondary axis $M_1$ for a centrical and vibration-free run. The static moment of the area $F_1$, or briefly its unbalance, amounts to $F_1 = S_1 \cdot e_1$, if $S_1$ denotes the weight acting in the center of gravity and $e_1$ the distance of the gravity center of the sickle-shaped area $F_1$ from the secondary axis $M_1$.

If now, according to the invention, an equalizing weight is provided whose moment, for each given radius of the rotor zone to be subsequently eliminated by machining, satisfies the equation $S_1 \cdot e_1 = f(x)$, then the correction unbalance $S_1 \cdot e_1$ to remain in the rotor after the center-balancing and prior to the machining can directly be compensated by simply displacing the equalizing weight simultaneously with the rotor as described in Patent 2,804,775 with reference to FIGS. 7 and 8 thereof, thus determining in a simple manner the proper secondary axis $M_1$ about which the final machining is to be performed in order to eliminate the original unbalance $U \cdot a$ of the rough rotor as well as the corrective unbalance $S_1 \cdot e_1$ purposely left in the rotor prior to the machining operation. Such an equalizing weight will lie on the reference diameter and be opposed to the weight $S_1$ resulting from the sickle-shaped area $F_1$ subsequently to be removed.

During the balance centering according to the invention, the rotor revolving together with the equalizing weight in proper angular relation to one another, as described above, is displaced relative to the axis of revolution until a balance indicating instrument shows the balance condition. The reason why there is balance about the axis $M_1$ thus established is the fact that, for instance relative to the area $F_1$, the following equation is satisfied:

$$S_t \cdot (x - e_0) = S_1 \cdot e_1,$$ wherein $S_t$ denotes the total weight of the rotor prior to the final machining. This defines the necessary distance $x$ of displacement as:

$$x = \frac{(S_t \cdot e_0) + (S_1 \cdot e_1)}{S_t} \quad (A)$$

The rotor according to the example of FIGS. 8 and 9, however, has four areas or unbalance moments which are to be centered by final machining. The outer sickle-shaped areas $F_2$ and $F_3$ have respective mass centers $S_2$ and $S_3$ spaced from the secondary axis $M_1$ by respective distances $e_2$ and $e_3$. The foregoing considerations relating to the area $F_1$ are also applicable to areas $F_2$ and $F_3$.

The fourth area of the illustrated example involves an unbalance to be eliminated by machining a center bore of the rotor. This fourth unbalance area $F_4$ may have a mass center $S_4$ at a distance of $e_4$ from axis $M_1$. Consequently, the static moment of this area has a diminishing effect upon the magnitude of the displacement distance $x$. This is because balance about axis $M_1$ obtains if:

$$S_t \cdot (e_0 - x) = S_4 \cdot e_4 \quad (B)$$

from which the displacement distance $x$ results as:

$$x = \frac{(S_t \cdot e_0) - (S \cdot \cdot e \cdot)}{S_t} \quad (C)$$

Consequently, the rotor illustrated in FIGS. 8 and 9 requires a total correction unbalance $S \cdot e$ which compensates for the algebraic sum of the static moments of the sickle-shaped areas $F_1$ to $F_4$:

$$(S_1 \cdot e_1) + (S_2 \cdot e_2) + (S_3 \cdot e_3) - (S_4 \cdot e_4) = S \cdot e \quad (D)$$

This compensation can, in principle, be effected by having a mass of constant weight revolve together with the rotor in the balance-centering machine at a variable distance from the axis of rotation.

The machine tool illustrated in FIG. 1 has essentially the design of a turret lathe. It comprises a machine base 1 upon which a headstock structure 2 is mounted. Located opposite the headstock upon base 1 is a displaceable tool support 3 which carries a number of tools on a revolver structure 4. Journalled in the headstock portion of the machine is a chuck 5 of a special design described below, which accommodates the workpiece 6 to be machined.

Figure 2:
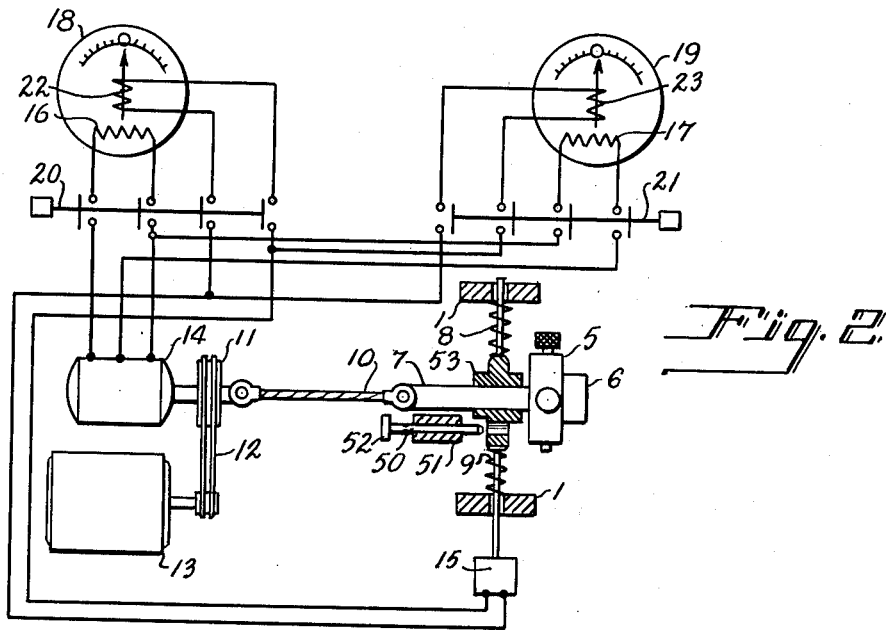
FIG. 2 is a schematic diagram relating to the same machine and explanatory of the balance-setting operation to precede the machining proper.

As is more fully apparent from the diagram of FIG. 2, the shaft 7 of chuck 5 is journalled in a bearing which is supported on the base 1 by means of springs 8, 9. It will be understood that the vibratory mounting structure is shown only schematically as such structures are well known in the art and their particular design not essential to the invention. The chuck shaft 7 is connected through a Cardanic link 10 with a sheave 11 driven by an endless belt 12 from an electric motor 13. Also connected with the shaft of sheave 11 is an alternating current generator 14 which furnishes two sinusoidal currents of 90° phase displacement relative to each other. Since the generator 14 is driven at the same speed as the workpiece 6, the frequency of the two alternating currents corresponds to the speed of workpiece revolution.

The chuck 5 and the entire rotating structure connected therewith are inherently balanced dynamically. When a workpiece 6 mounted on chuck 5 is unbalanced, it causes the rotating assembly to vibrate. These vibrations are sensed by an electromagnetic pickup 15. Since such vibrations have the frequency of the workpiece revolution, the pickup voltage is synchronized with the alternating currents produced by generator 14. The two reference-current circuits of generator 14 are connected to the respective field coils 16, 17 of two wattmetric instruments 18, 19 under control by respective switches 20, 21 which also connect the moving coils 22, 23 of the wattmeters to the pickup 15.

When the workpiece is clamped in the chuck and the machine drive 13 is running, the two wattmeters, excited by 90° phase-displaced field currents, respond to any unbalance by indicating its respective components in two mutually perpendicular directions corresponding to the respective directions in which the workpiece is displaceable on the chuck with the aid of the shifting or balancing devices still to be described. If the operator, when actuating the switches 20, 21, observes an unbalance indication, he operates the shifting of balancing devices. The operation of these devices has the effect of placing the gravity center or main inertia axis of the workpiece 6 into coincidence with the geometric axis of revolution so that the assembly comprising the inherently balanced chuck 5 and the workpiece 6 becomes balanced. Attainment of such balance is observable by the fact that when the switches 20, 21 are actuated, no deflection occurs in the wattmetric instruments or only a deflection within permissible limits. Since the coordinate directions of displacement on the chuck are identical with the two coordinate directions of unbalance indication determined by the two 90° phase-displaced currents from the reference generator 14, the amounts of displacement necessary in the two respective directions 31—32 and 33—34 for establishing balance are indicated by the respective instruments 16 and 17.

When the workpiece is thus shifted into balance position, it is ready for machining. For this purpose, it is preferable to arrest the rotating assembly by means of stops in order to prevent vibration during the machining run. Such a stop is schematically shown at 50 in FIG. 2. The stop is displaceable in a guide structure 51 by means of a handle 52. Several stops may be engaged with the bearing 53 under control by a single handle to rigidly join the chuck bearing with the machine base.

The operator now causes the machine tool to advance the cutting tool against the rotating workpiece in the same manner as is usually done for work on a lathe. It will be noted that no center-marking or center-drilling is necessary and that the workpiece is being machined on the same machine tool previously used for obtaining the balanced run. As a matter of fact, the illustrated workpiece is hollow so that it would not be possible to first drill center points for use in subsequently operating machine tools.

In principle, the invention permits first performing a rough machining operation on one machine and then transferring the workpiece one or several times to other machine tools for subsequent fabrication up to the finished or semi-finished product. In this case, each of the subsequent machine tools is designed in accordance with the machine described above; that is, each of these machines has its own vibratory mounting for the headstock assembly as well as a balance-indicating and balance-centering means. Preferably, however, the entire series of sequential machining operations is performed on a single machine for which purpose a turret-type machine, as shown, is preferable. If desired, the workpiece can be checked for continued balance after each individual machining operation or after groups of such operations.

The devices incorporated in the chuck 5 for balance-positioning the workpiece 6 will now be described with reference to FIGS. 3 and 4. The chuck structure comprises four clamping cheeks or jaws 31, 32, 33, 34 between which the workpiece 6 is firmly secured. The clamping cheek 31 is mounted on a screw spindle 35 which passes through a bore of the chuck body and is in threaded engagement with a nut or knob 36 rotatably secured to the chuck body. The clamping cheek 32 forms an abutment diametrically opposite the cheek 31 and is part of a displaceable plunger biased by a stiff spring 37. The clamping cheeks 33 and 34 are designed and operative in the same manner as the respective cheeks 31 and 32.

After placing the workpiece 6 into approximately centered position and performing a first measuring run, the two adjusting knobs 36 are actuated by the operator to displace the woarkpiece 6 against the respective abutment cheeks until the instruments do not show an unbalance deflection. When this is achieved, the inertia axis of the workpiece coincides with the axis of revolution.

The tool 38 then performs the first machining operation, for example as shown, along the inner periphery of the hollow workpiece 6.

The machining steps to be performed are supposed to satisfy the condition that all sequential machining operations must be accurately concentric to one another. The clamping surface of the workpiece to be machined may be completely raw so that a center adjustment on geometric principles would be useless. After the workpiece 6' is positioned on the oscillatorily mounted chuck structure so that the inertia axis of the workpiece coincides with the axis of revolution, the geometric conditions of the workpiece surface or periphery become negligible. The accuracy with which the workpiece is to be thus adjusted depends upon the accuracy or tolerance requirements of the individual machining steps represented in portions A to D of FIG. 5 and further described presently.

After the first machining run has been completed by operation of the tool 38 (FIG. 4A), the workpiece 6 is mounted and balance-centered on the second machine tool of corresponding design which then performs the second machining step using the tool 39 shown in FIG. 4B. As explained, the second machining operation, as well as the subsequent operations, may also be performed on a single machine with a plurality of sequentially operating tools as is the case in the machine described above with reference to FIG. 1. When a second machine tool is used, it must be equipped with workpiece-holding and oscillation-determining devices as mentioned above with reference to the first-operating machine.

The same balance-centering and subsequent machining operations are repeated in the machine tools or machining stages represented in portions C and D of FIG. 4 where the respective tools 40 and 41 perform the machining operations. All individual machining steps according to the example illustrated in FIG. 4 are performed in symmetrical relation to the coincident inertia and journalling axes.

FIG. 5 illustrates an example of machining operations asymmetrical to the inertia axis and running axis of the workpiece. The means for performing the machining steps are similar to those described with reference to FIG. 4. For that reason, the components illustrated in FIG. 5 are designated by the same reference numerals as the corresponding components in FIG. 4. However, corresponding to the amount "X" of displacement between the inertia axis 47 of the workpiece 6' and the axis of chuck revolution 48, the chuck 5 must be loaded with an equalizing moment by attaching to the chuck a counterpoise 46 having the weight "G". The magnitude of weight G is determined by the equation $S \cdot x = G \cdot a$, wherein $S \cdot x$ is the unbalance moment inherent in the asymmetrical workpiece and $a$ is the distance of the gravity center of weight 46 from the axis of revolution. As in FIG. 4, the portions A to D of FIG. 5 represent schematically four sequential machining operations to be carried out by four different tools of the same machine or by four different machine tools as described above, the center adjusting operation being repeated prior to each machining step.

It will be understood that while the foregoing examples relate to a workpiece of axially short length, the invention is analogously applicable to axially elongated workpieces which require being journalled in two bearings at each of the two ends of the rotating workpiece. In such cases, the journals on both sides of the workpiece are to be vibratorily mounted, the two pickups being located at the respective bearings.

Figure 6:
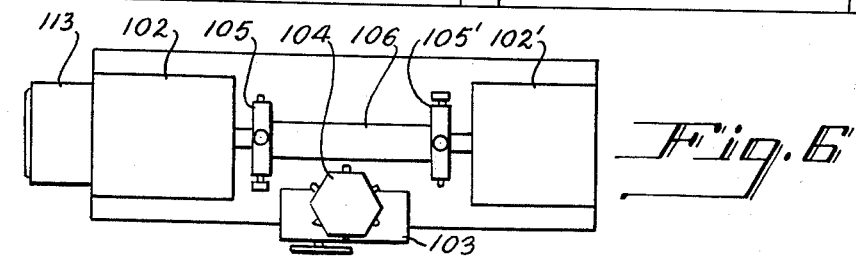
FIG. 6 is a top view of another machine tool.

Such a machine is illustrated in FIG. 6 in which the machine base is denoted by 101, the headstock portion by 102, the tool support by 103, the revolvable tool carrier by 104, two chucks by 105 and 105', and a workpiece by 106. The headstock portion 102 comprises a vibratorily mounted journal bearing for the chuck 105 as described above. A similar vibratory bearing for the chuck 105' is located in the tailstock portion 102'.

Figure 7:
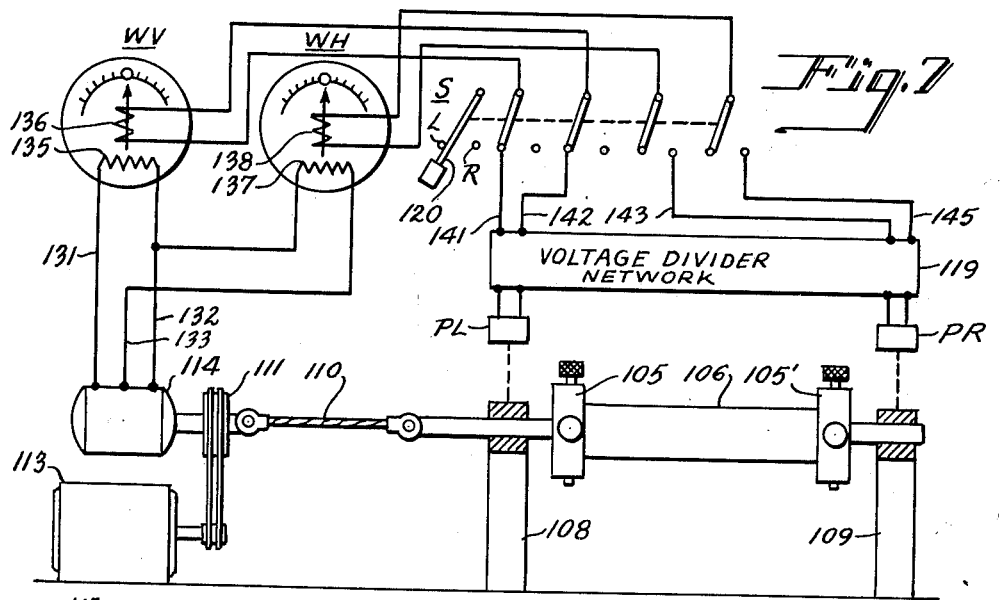
FIG. 7 is an explanatory diagram relating to the machine according to FIG. 6.

In FIG. 7, the two bearings are schematically shown supported by leaf springs 108 and 109 and connected with respective pickups PL and PR. Chuck 105 is driven through a Cardanic shaft 110 and a belt sheave 111 from a motor 113 together with a generator 114 which furnishes two alternating currents 90° phase-displaced from each other. The pickup voltages are supplied to two wattmetric instruments WV and WH through an electric compensating network 119 of potentiometer resistors. The design and operation of such a network need not be described herein because such networks are well known from commercially available balancing machines and are described, for instance, in the references cited above. However, it will be sufficient for understanding the machine according to the invention if it is kept in mind that the function of the network 119 is simply to make only a share of the pickup voltage effective that is indicative of vibrations in the transverse plane (reference plane) of the left-hand pickup PL when a selector switch S, described below, is set to a position in which only these particular vibrations are to be indicated. Correspondingly, the network 119 has the effect that only the vibrations in the right-hand correction plane (transverse plane in which the pickup PR is effective) are indicated when the selector switch S is set accordingly.

The selector switch S is shown to have a handle 120 which can be set into any one of two positions denoted by L and R. When the switch S is set to the position L as shown, the generator 114 supplies "vertical" reference voltage through leads 131 and 132 to the field coil 135 of the wattmetric instrument WV, while simultaneously the moving coil 136 of the same instrument receives voltage from output leads 141, 142 of the network 119 which voltage is indicative of the vibrations occurring in the plane of the left-hand pickup.

Since the reference genator 114, as explained, is synchronized with the rotation of the workpiece, the excitation which the generator supplies to the wattmeter field coil 135 varies periodically at the frequency of the workpiece revolutions and in a fixed phase relation thereto. The deflection of the wattmeter pointer is proportional to the product of the pickup voltage as applied to the moving coil 136 and the phase-selected current flowing from generator 114 through field coil 135. Hence, the wattmeter deflection corresponds to only that component of unbalance which is in phase with the field coil current. Since the generator current is so phase-adjusted that it determines the unbalance components in two predetermined and mutually perpendicular directions, the indication of the wattmeter WV corresponds to the amount of vertical unbalance vibration in the left-hand reference plane.

Simultaneously, in the same position of switch S the moving coil 138 of wattmeter WH is connected to the voltage divider network 119 as described above so that it responds to vibrations occurring in the left reference plane. Now, however, the field coil 137 of wattmeter WH is connected across leads 132 and 133 to generator 114 so that a 90°-displaced generator current flows through the field coil 137. As a result, the indication of instrument WH is indicative of the horizontal component of the vibrations occurring in the left-hand reference plane.

Analogously, when switch S is set to position R, the instruments WV and WH indicate the vertical and horizontal components of vibration in the right-hand reference plane, in dependence upon the voltage supplied by pickup PR.

In summary, the sequential operation of the two-position switch S by the operator permits obtaining respective wattmeter readings which correspond to the individual four unbalance components, that is, the left-vertical, left-horizontal, right-vertical and right-horizontal unbalance components.

The two chucks 105 and 105′ are designed and operated in the same manner as described above with reference to chuck 5 in FIGS. 1 to 5, and the workpiece-shifting devices of both chucks are directionally correlated to the two reference currents of generator 114. Hence, after reading the unbalance indications, the operator adjusts each shifting device in accordance with the corresponding indicated amount so as to establish a balanced run of the workpiece, if necessary, after repeated checking of the instruments WV and WH. Thereafter, the chuck bearings are arrested as described with reference to FIG. 2, and the workpiece 106 is machined at its periphery in any desired number of machining stages as described above with reference to FIG. 4 or 5.

While the invention can be carried out with manual operation of the workpiece-balance adjusting means of the chucks, these adjusting means may also be operated automatically while the workpiece holder is in rotation. In this respect, further reference may be had to my above-mentioned copending applications Serial No. 268,156, filed January 25, 1952, now issued as Patent No. 2,804,-775, and Serial No. 522,335, filed July 15, 1955, both describing automatic devices which operate during rotation of the workpiece to shift the inertia axis of the workpiece into coincidence with the axis of rotation under control by the wattmetric indication of measured unbalance.

I claim:

1. A machine tool, comprising a base, journal means resiliently mounted on said base for vibration relative thereto, a balanced chuck for clamping the workpiece to be machined, said chuck being rotatable in said journal means to cause vibration thereof when the rotating chuck is unbalanced by the workpiece, displacing means on said chuck for shifting the workpiece into balance position to eliminate such vibration, drive means on said base connected with said chuck for rotating it, a tool support mounted on said base and having tool means located laterally to the axis of said journal means for machining the workpiece on said chuck during balanced rotation thereof, and stop means for arresting vibration of said journal means during said machining of said workpiece.

2. A machine tool, comprising a base, journal means resiliently mounted on said base for vibration relative thereto, a balanced chuck for clamping an inherently unbalanced workpiece to be machined, said chuck being rotatable in said journal means to cause vibration thereof when the rotating chuck-workpiece assembly is unbalanced, displacing means on said chuck for shifting the workpiece into balance position to eliminate such vibration, counterpoise means eccentrically mounted on said chuck for compensating unbalance due to eccentric setting of the workpiece by said displacing means, a drive mounted on said base for rotating said chuck, a tool base mounted on said support and displaceable toward and away from said chuck in a direction parallel to the axis of said journal means, and cutting tool means stationarily mounted on said support and having a cutting edge radially spaced from said axis for machining the workpiece on said chuck during balanced rotation thereof, and stop means for arresting vibration of said journal means during said machining of said workpiece.

3. A turret lathe, comprising a base, a headstock resiliently mounted on said base for vibration relative thereto, a chuck rotatably journalled in said headstock and having clamping means for holding the workpiece to be machined, said clamping means having a center axis displaceable relative to the journal axis of said chuck for setting the workpiece to a position where no vibrations of said headstock are caused by rotation of the chuck-workpiece assembly, and a tool-carrier turret displaceable on said base in front of said chuck and having selectively operable cutting tools located eccentrically to said journal axis for peripherally machining the workpiece on said chuck during balanced rotation thereof, and stop means for arresting vibration of said journal means during said machining of said workpiece.

4. A machine tool, comprising a base, journal means resiliently mounted on said base for vibration relative thereto, a chuck for clamping the workpiece to be machined, said chuck being rotatable in said journal means to cause vibration thereof when the rotating chuck is unbalanced by the workpiece, an unbalance measuring device responsive to said vibrations and having instrument means indicative of unbalance components in two coordinate directions perpendicular to each other, two mutually coactive displacing devices on said chuck for shifting the workpiece into balance position to eliminate said vibration, said two displacing devices having respective directions of displacement coincident with said respective coordinate directions so that balance is substantially established by respective displacements proportional to the two indicative magnitudes of said instrument means, stop means engageable with said journal means for arresting any vibration of said journal means when balance is established and for rigidly maintaining said journal means, chuck, and workpiece in balanced position during machining of said workpiece, drive means on said base connected with said chuck for rotating it, a tool support mounted on said base and having tool means located eccentrically to the axis of said journal means for peripherally machining the workpiece on said chuck during balanced rotation thereof.

5. In a machine tool having a cutting tool movably and eccentrically mounted relative to the axis of a rotating workpiece, a device for preparing an inherently unbalanced rotatable workpiece for machining operations in order to displace the main inertia axis of the workpiece to coincide with its axis of rotation so that said workpiece is dynamically balanced about said axis of rotation during the machining operations, said device comprising at least one workpiece holder resiliently and rotatably journalled on said machine tool for rotation relative thereto, unbalance measuring and indicating means associated with said machine tool and connected to said workpiece holder for response to vibrations of the latter caused by inherent unbalance of the workpiece mounted thereon, said measuring and indicating means having instrument means indicative of unbalance components in two coordinate directions perpendicular to each other, and means carried by said workpiece holder for adjusting the combined inertia axis of said holder and workpiece to coincide with the rotational axis thereof, stop means for arresting vibration of said workpiece holder during said machining operations, whereby said cutting tool machines the workpiece on said holder during balanced rotation thereof to remove material from the periphery of said workpiece while the latter is rotating about said combined inertia axis, and whereby the workpiece after said machining operations is dynamically balanced.

6. A device as set forth in claim 5, said means carried by said holder including adjusting means for laterally shifting said workpiece within said holder for adjusting said combined inertia axis.

7. A device as set forth in claim 5, said means carried by said workpiece holder including counterpoise means mounted thereon to exert a variable and predetermined unbalance moment on the workpiece accommodated in said holder.

References Cited in the file of this patent

UNITED STATES PATENTS

| | | |
|---|---|---|
| 1,338,742 | Lofton | May 4, 1920 |
| 2,140,398 | Buckingham | Dec. 13, 1938 |
| 2,693,695 | Jacoksen | Nov. 9, 1954 |
| 2,804,775 | Hack | Sept. 3, 1957 |

FOREIGN PATENTS

| | | |
|---|---|---|
| 696,962 | Germany | Oct. 3, 1940 |